(No Model.)
C. W. & E. JESCHKE.
TILE DITCHING MACHINE.
No. 544,258. Patented Aug. 6, 1895.
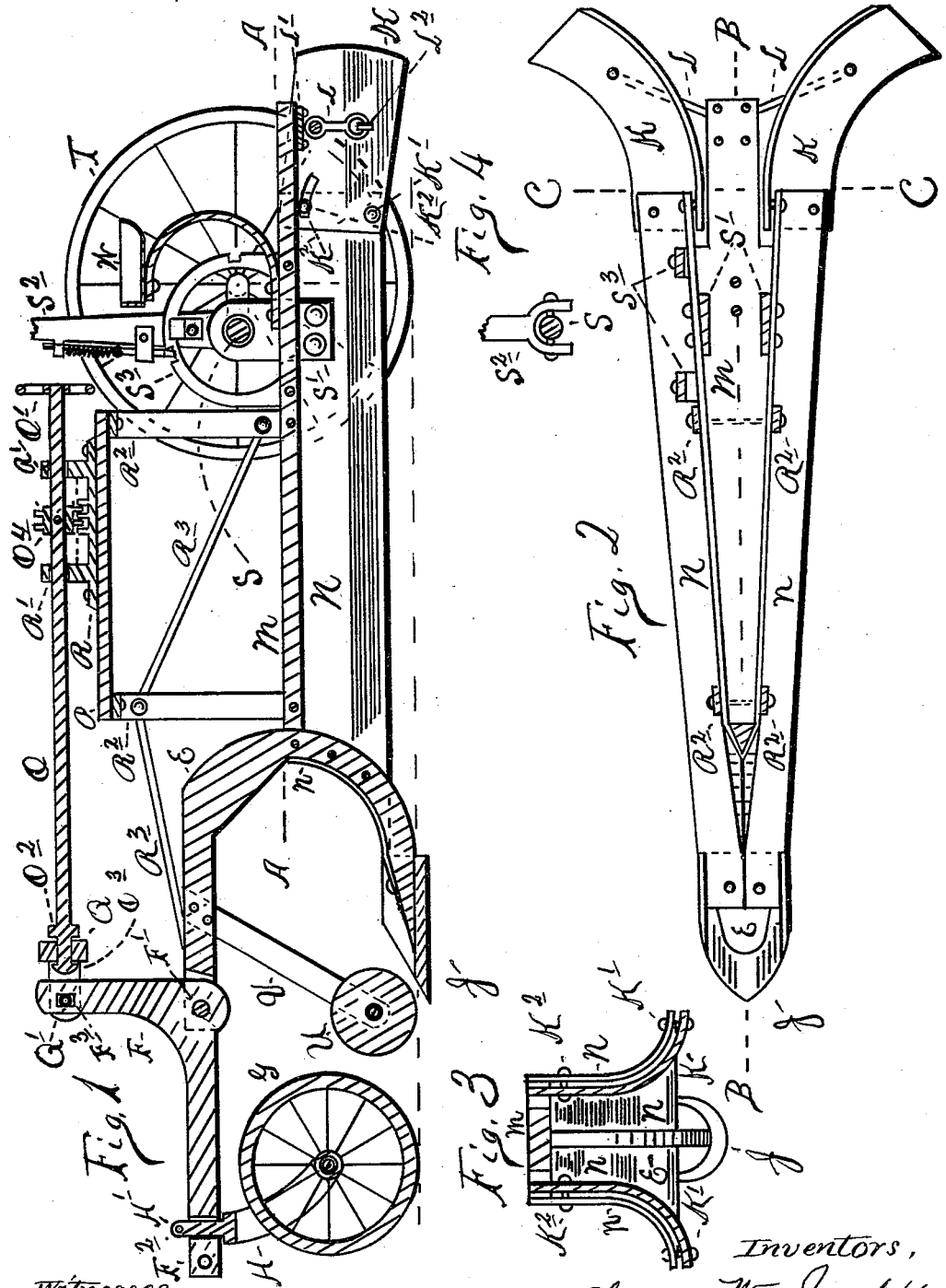
Witnesses
E. R. Pontius.
Geo. B. Smith.
Inventors,
Charles W. Jeschke
Edward Jeschke
by Frank J. Tuttle
Atty.

UNITED STATES PATENT OFFICE.

CHARLES W. JESCHKE AND EDWARD JESCHKE, OF VICKERY, OHIO.

TILE-DITCHING MACHINE.

SPECIFICATION forming part of Letters Patent No. 544,258, dated August 6, 1895.

Application filed January 3, 1895. Serial No. 533,787. (No model.)

*To all whom it may concern:*

Be it known that we, CHARLES W. JESCHKE and EDWARD JESCHKE, citizens of the United States, residing at Vickery, in the county of Sandusky and State of Ohio, have invented a new and useful Improvement in Tile-Ditching Machines, of which the following is a specification.

This invention relates to that class of ditching-machines which are used and adapted to the excavating of trenches wherein to lay a series of drain-tile.

Referring to the drawings which are made a part hereof, Figure 1 represents a vertical lengthwise section of the machine along its median line, and being the line B B of Fig. 2. Fig. 2 represents that portion of the machine seen below the line A A of Fig. 1, seen in top plan. Fig. 3 is a vertical transverse section along the line C C of Fig. 2. Fig. 4 is a vertical section of the bent axle S along the side of the lever $S^2$, showing the means provided for attaching the same to said axle, the pivot passing through the axle.

Some parts of this invention are similar to like parts in our invention covered by Letters Patent No. 526,864, and are used for like purposes.

Our machine in part consists of a body-piece composed of the rigid bent beam E, the two side or mold boards N N, the platform M, and the oval or scoop shaped point J, all securely fixed together by threaded bolts and nuts. A bent lever F is provided, which is hinged to the upper end of the beam E by the pivot F'. A grade-wheel G is properly journaled between and upon the lower extremities of the bent arms H, and said arms, connected at their upper extremities, are provided with a vertical pivot H', which passes through a suitable opening in the forward end of the horizontal arm of said bent lever, and by means of which said arms are swiveled upon the under side of said horizontal arm. The pivot H' is suitably held in place preferably, as shown in the drawings, by a suitable key inserted through an aperture in said pivot just above said horizontal arm.

For some kinds of soil we provide a revolving disk-cutter U, which is properly journaled upon the lower end of an arm V, which itself is securely fastened at its upper end by threaded bolts and nuts to the upper arm of the bent beam E, near its forward end.

For some kinds of soil we provide a cutter, which is hooked or bent forward, and being securely seated against the forward edge of the body of the machine, it is secured thereto just below the line of the platform M. We find this sort of a cutter to be necessary in some kinds of soil, but we do not now illustrate or claim the same.

The bent lever F is provided with a slot $F^3$, through which are pivoted the arms Q' of the swivel-joint Q, which itself is swiveled upon the forward end of the operating-rod O.

The body of the machine is made to carry a table P supported by the standards $R^2$, and the same is securely held in place by the brace-rods $R^3$, the forward end of the forward rod being secured to the pivot F' by an eye and pivot. Securely mounted upon the top of the table P is a rack R provided with the projecting arms R', through journal-bearings in which the operating-rod O is free to pass. The operating-rod O is provided at one end with an operating-wheel O', and it is provided at its other end with a shoulder $O^2$, and when united with the swivel-joint Q is held in place by any suitable means, as by the pivot-head $O^3$. The operating-rod O is made to carry a worm-wheel $O^4$, which engages with the teeth upon the rack R, so that as the rod O is operated the grade-wheel G is made to rise or fall, and by engagement of the worm-wheel with the rack the wheel is held where desired, and the point J above or below the surface.

For the convenience of the operator a seat W is provided, so disposed that the driver may reach and operate the rod O.

The earth being excavated by the point J is raised to the surface by means of the side or mold boards N N, and to carry the same away from the edge of the trench a sufficient distance we provide the wings K K, which reasonably conform in shape to the inner side of the side boards N N. These wings are secured to the body of the machine upon the inner side of the side board N by the pivots K' and $K^2$. The pivot $K^2$ is made to pass through a suitable slot in the wings K K, all being so adapted and disposed that as the point of the body portion of the machine dips, the rear ends of the wings K K will remain in contact with the ground.

L' is a plate secured upon the under side of the platform M, and made to carry an eyebolt or staple to which the eye-rod L is made fast at one end, while its other end is secured to a similar staple or eyebolt $L^2$ made fast to the wings K. By means of said rods L L the wings are thus so connected to the platform M that when the platform tilts, which it does as the point J is allowed to fall, the wings are correspondingly operated. Said platform M being supported by the lugs S', the rear end is made to rise as the point J dips, and vice versa, the wings K K being respectively drawn inward or thrown outward accordingly, and operating automatically. By this means we provide for accumulating earth while we hold the wings rigidly apart and equidistant from the edge of the trench during the time the point J remains upon the same level.

To facilitate transportation of the machine from place to place we provide a bent axle S, which, passing freely through the lugs S' fixed to the body of the machine, is made to support the burden of the machine, while at the same time, by rotating said axle, the rear part of the body is raised clear from the ground. Said axle is provided with a lever $S^2$, by means of which said axle is rotated while supported by wheels T. The lever $S^2$ is provided with the usual means of locking with an arched locking-bar $S^3$, which is bracketed to the body of the machine. The lever $S^2$ is provided with a finger clasping said locking-bar, whereby the lever is held in place, and by means of suitable notches in the locking-bar the axle upon being rotated is held where desired. The point J is rounded at its forward end as well as the body of it and is made oval, as shown in Fig. 3, so that whatever position or angle the point may assume the bottom of the trench will be made to conform to the surface of the tile which are to be used therein, and thereby we secure a better drain, the tile being held in true line while covering. The method of operating our machine will now be readily understood.

Draft is applied by horse or other power to the machine by means of a suitable clevis, the bolt of which is made to be passed through the aperture $F^2$.

It is designed that the machine shall be made to pass repeatedly over the work before completion, and upon returning each time the depth of cut is regulated by operating the rod O until finally the operator determines the grade of the ditch or trench by the water-level.

It is manifest that the size of the machine must be governed by the trench required; but, inasmuch as the repeated action of the grade-wheel G in passing and repassing through the trench wears away the sides of said trench, we make the body of the machine wider at its rear end by a little more than one-half than it is at the forward end and thereby secure a constant engagement of the lower edge of the side boards N N with the walls of the trench throughout their entire length, and so prevent earth from falling back into the trench while in transit to the surface.

Having fully described our invention, what we now claim as new and pray that Letters Patent may be granted for, is—

1. In ditching machines a body portion composed of a rigid bent beam E, the two side or mold boards N N, the platform M and the oval or scoop shaped point J secured to each other and the lugs S' supported by the bent axle S and carried by the wheels T, T, all in combination substantially as and for the purpose set forth.

2. The table P, rack R, operating rod O carrying a worm wheel engaging said rack, swivel joint Q, the bent lever or bell crank F, hinged to the forward end of the plow beam E, the arms H, provided with the vertical pivot H' and journaled to and carrying the grade wheel G, together with ordinary means provided for securing the several parts together, together with the table supports $R^2$ and the stay rods $R^3$ secured to said supports and the plow beam E, all in combination substantially as and for the purpose set forth.

3. A body piece consisting of the rigid bent beam E the two side or mold boards N, N, the platform M and the rounded or scoop shaped point J the rods L L the wings K K and the means provided for securing the several parts together all in combination substantially as and for the purpose set forth.

CHARLES W. JESCHKE.
EDWARD JESCHKE.

Witnesses:
GEO. B. SMITH,
C. R. PONTIUS.